US011693855B2

(12) United States Patent
Khorasani et al.

(10) Patent No.: US 11,693,855 B2
(45) Date of Patent: Jul. 4, 2023

(54) AUTOMATIC CREATION OF SCHEMA ANNOTATION FILES FOR CONVERTING NATURAL LANGUAGE QUERIES TO STRUCTURED QUERY LANGUAGE

(71) Applicant: International Business Machines Corporation, Armonk, NY (US)

(72) Inventors: Elahe Khorasani, Yorktown Heights, NY (US); Hangu Yeo, Westchester, NY (US); Octavian Popescu, Westchester, NY (US); Vadim Sheinin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 16/722,994

(22) Filed: Dec. 20, 2019

(65) Prior Publication Data

US 2021/0191936 A1 Jun. 24, 2021

(51) Int. Cl.
G06F 16/2452 (2019.01)
G06F 16/28 (2019.01)
G06F 16/25 (2019.01)
G06F 16/2457 (2019.01)
G06N 20/00 (2019.01)

(52) U.S. Cl.
CPC .. *G06F 16/24522* (2019.01); *G06F 16/24573* (2019.01); *G06F 16/252* (2019.01); *G06F 16/288* (2019.01); *G06N 20/00* (2019.01)

(58) Field of Classification Search
CPC ......... G06F 16/24522; G06F 16/24573; G06F 16/252; G06F 16/288; G06F 16/284; G06F 16/243; G06N 20/00
See application file for complete search history.

(56) References Cited

U.S. PATENT DOCUMENTS

| 7,640,254 | B2 | 12/2009 | McConnell |
| 9,697,192 | B1* | 7/2017 | Estes ...................... G06F 40/30 |
| 9,959,311 | B2 | 5/2018 | Boguraev et al. |
| 10,719,667 | B1* | 7/2020 | Roy ........................ G06F 40/40 |
| 2004/0078190 | A1* | 4/2004 | Fass ...................... G06F 40/211 |
| | | | 704/7 |
| 2010/0036788 | A1 | 2/2010 | Wu et al. |

(Continued)

FOREIGN PATENT DOCUMENTS

CN 110019555 A 7/2019

OTHER PUBLICATIONS

L. Zhang, et al., "Automatic Generation of Ontology Based on Database", Journal of Computational Information Systems 7:4 (2011) 1148-1154, https://tinyurl.com/yyqk2e7j, 7 pages.

(Continued)

*Primary Examiner* — Pierre M Vital
*Assistant Examiner* — Zuheir A Mheir
(74) *Attorney, Agent, or Firm* — Edell, Shapiro & Finnan, LLC (57) ABSTRACT

Methods, systems and computer readable media are provided for automatically creating a semantic model of a relational database for processing natural language queries. A computing device automatically extracts relational database metadata. The computing device prompts a user to enter textual labels for columns of the extracted metadata. The computing device automatically generates a schema annotation file based upon the relational database metadata and the textual labels for the columns. A natural language query is processed for the relational database using the schema annotation file.

14 Claims, 7 Drawing Sheets

(56) References Cited

U.S. PATENT DOCUMENTS

| | | | |
|---|---|---|---|
| 2010/0185643 A1 | 7/2010 | Rao et al. | |
| 2014/0143353 A1* | 5/2014 | Wang | H04L 51/04 |
| | | | 709/206 |
| 2015/0058337 A1* | 2/2015 | Gordon | G06N 7/005 |
| | | | 707/769 |
| 2016/0371275 A1* | 12/2016 | Bernstein | G06F 40/18 |
| 2017/0083569 A1* | 3/2017 | Boguraev | G06F 40/205 |
| 2018/0011903 A1 | 1/2018 | Abolhassani et al. | |
| 2018/0096058 A1* | 4/2018 | Anderson | G06F 16/35 |
| 2019/0034540 A1* | 1/2019 | Perkins | G06F 16/9535 |
| 2019/0294665 A1* | 9/2019 | Matskevich | G06F 40/284 |
| 2020/0034479 A1* | 1/2020 | Winzenried | G06F 16/285 |
| 2021/0005316 A1* | 1/2021 | Neumann | G16H 50/70 |

OTHER PUBLICATIONS

J. An, et al., "Methodology for Automatic Ontology Generation Using Database Schema Information", Research Article, Hindawi, Mobile Information Systems, vol. 2018, Article ID 1359174, https://tinyurl.com/y5hmfnqd, May 2, 2018, 14 pages.

R. Ghawi, et al., "Database-to-Ontology Mapping Generation for Semantic Interoperability", VLDB '07, Sep. 23-28, 2007, Vienna, Austria, https://tinyurl.com/yxb67r7v, 8 pages.

T. Naz, et al., "Fully automatic OWL generator from RDB schema", International Journal of Advanced and Applied Sciences, 5(4) 2018, pp. 79-86, Feb. 10, 2018, https://tinyurl.com/yymy8elm, 8 pages.

International Search Report and Written Opinion in corresponding International Application No. PCT/IB2020/062189, dated Mar. 30, 2021, 10 pages.

\* cited by examiner

| elementLabel | tableName | columnName | dataType | semanticType |
|---|---|---|---|---|
|  | EMPLOYEE | EMPNO | integer |  |
|  | EMPLOYEE | EMPNAME | string |  |
|  | EMPLOYEE | MGRNAME | string |  |
|  | EMPLOYEE | BIRTHDATE | timestamp |  |
|  | EMPLOYEE | HIREDATE | timestamp |  |
|  | EMPLOYEE | LEAVEDATE | timestamp |  |
|  | EMPLOYEE | SALARY | decimal |  |
|  | EMPLOYEE | DPTNAME | string |  |

FIG.3B

| elementLabel | tableName | columnName | dataType | semanticType |
|---|---|---|---|---|
| employee id | EMPLOYEE | EMPNO | integer | person |
| employee name | EMPLOYEE | EMPNAME | string | person |
| name of manager | EMPLOYEE | MGRNAME | string | person |
| employee birthday | EMPLOYEE | BIRTHDATE | timestamp | date |
| employee hire date | EMPLOYEE | HIREDATE | timestamp | date |
| employee leave date | EMPLOYEE | LEAVEDATE | timestamp | date |
| salary of employee | EMPLOYEE | SALARY | decimal | money |
| department name | EMPLOYEE | DPTNAME | string | none |

FIG.3C

Example SAF employee has id;
employee has name;
manager has name;
employee has manager;
　　employee works for manager;
employee has birthday;
hiring has date;
employee has hire date;
Employee is hired on a date
leave has date;
employee has leave date;
Employee is left on a date
employee has salary;
department has name;
employee has department;
　　employee works in a department;
　　employee is hire in a department;

AUTOMATIC CREATION OF SCHEMA ANNOTATION FILES FOR CONVERTING NATURAL LANGUAGE QUERIES TO STRUCTURED QUERY LANGUAGE

1. TECHNICAL FIELD

Present invention embodiments relate to rule-based systems that convert natural language queries to a structured query language, and in particular, to systems that automatically generate schema annotation files based on user annotation of metadata to describe relationships in the database for processing natural language queries.

2. DISCUSSION OF THE RELATED ART

Relational database management systems may be used to store and manage structured data. Data in the database may be accessed based on technical knowledge and expertise in a structured query language, and is generally a complex and time-intensive process. To improve access to stored data, natural language interface to database systems may be used, which allows a user to access data by asking natural language questions and receiving answers from the database. The natural language interface to database system converts natural language expressions to a structured query, which provides for simple and fast access to the information in the database.

Rule-based natural language interface to database systems operate using a semantic model of the database elements that defines relationships between entities. Rule-based natural language interface to database systems rely on an ontological representation of the database, involving the classification of entities and modeling of the relationships between those entities.

However, generating a database ontology has typically been a time consuming and manually intensive process. Database ontologies utilize a schema to specify the type of relationship that entities have with each other. Typically, the explicit nature of the relationship between entities is provided by experts with a deep knowledge of the underlying database structure and ontology. For example, in traditional approaches, creating a schema annotation file is performed by a user having knowledge of the database structure and ontology as well as the schema annotation file structure and supported formats of the phrases and the flag statements used to create the schema annotation file.

Creating such a semantic model or ontology is a time-consuming manual process that requires deep knowledge of the database structure and schema, as each relationship is defined in a manual manner. For large or complex systems, this approach is not tenable.

SUMMARY

According to embodiments of the present invention, methods, systems, and computer readable media are provided for automatically creating a semantic model of a relational database for processing natural language queries. A computing device automatically extracts relational database metadata. The computing device prompts a user to enter textual labels for columns of the extracted metadata, and automatically generates a schema annotation file based upon the relational database metadata and the textual labels for each column. A natural language query for the relational database is processed using the schema annotation file. The system may generate lexical rules based upon the automated schema annotation file. This approach provides an automated approach to generating a schema annotation file based on annotated metadata, in contrast to traditional approaches in which schema annotation files are generated manually.

According to another aspect, the user annotates the extracted metadata without knowledge of a structure of the relational database or of an ontology of the relational database. This approach provides the advantage of being able to generate a schema based on the annotated metadata without specialized knowledge of the underlying database or ontology.

In another aspect, the schema annotation file is processed into lexical rules with semantic annotation for the relational database. In still further aspects, a natural language question is received from a user. The received natural language question is converted into a structured query using lexical rules generated based upon semantic annotation. An answer to the received natural language question is generated based upon results of the structured query. These approaches have the advantage of allowing a user to ask questions about the content of the database, and for the system to retrieve the relevant content of the database based on the lexical rules generated based on the schema annotation file. This approach does not require a user to generate a structured query to access the content in the database.

In other aspects, annotation of the extracted metadata includes textual labels, wherein the textual labels include at least a semantic type and an element label. Here, a minimum amount of annotation (e.g., in the examples provided herein, only two columns are annotated) is needed in order for the schema to be generated.

In other aspects, the schema annotation file is created using natural language processing of user input to extract semantics, and the extracted semantics are used to create relationships between the entities of the relational database. Creation of the schema annotation file using natural language processing allows relationships to be established in an automated manner.

In further aspects, a machine learning system may be used to create schema-specific lexical rules with semantic annotation, wherein the machine learning system uses the schema annotation file and template rules based on fixed syntactical rules of English language to create the schema-specific lexical rules. This approach has the advantage of further automating the NLIDB system for interaction with a user.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

Automated techniques are provided for creating an ontological representation or semantic model of a relational database in the form of a schema annotation file (SAF). The SAF is a text file that may be used for adapting a natural language interface to a database (NLIDB) system to a particular schema, and does not rely on knowledge of the underlying database structure and ontology.

In embodiments, relational database metadata is automatically extracted that describes the structure of the database. A user annotates (e.g., provides a text-based label) the columns of the extracted metadata. Based on the techniques provided herein, semantic relationships between the labeled extracted database entities are automatically annotated to form a semantic model. In embodiments, the semantic model is produced in natural language text that may be processed by any natural language processing (NLP) system to generate lexical rules that apply to the relational database. The generated SAF may be used to automatically adapt the NLIDB system to a particular database schema.

Techniques for creating an ontological model in the form of a SAF, a type of text file that represents the semantic model of the database, are provided herein. Based on minimal input from a user, and with no prior knowledge of the database, a SAF may be automatically generated.

Figure 1:
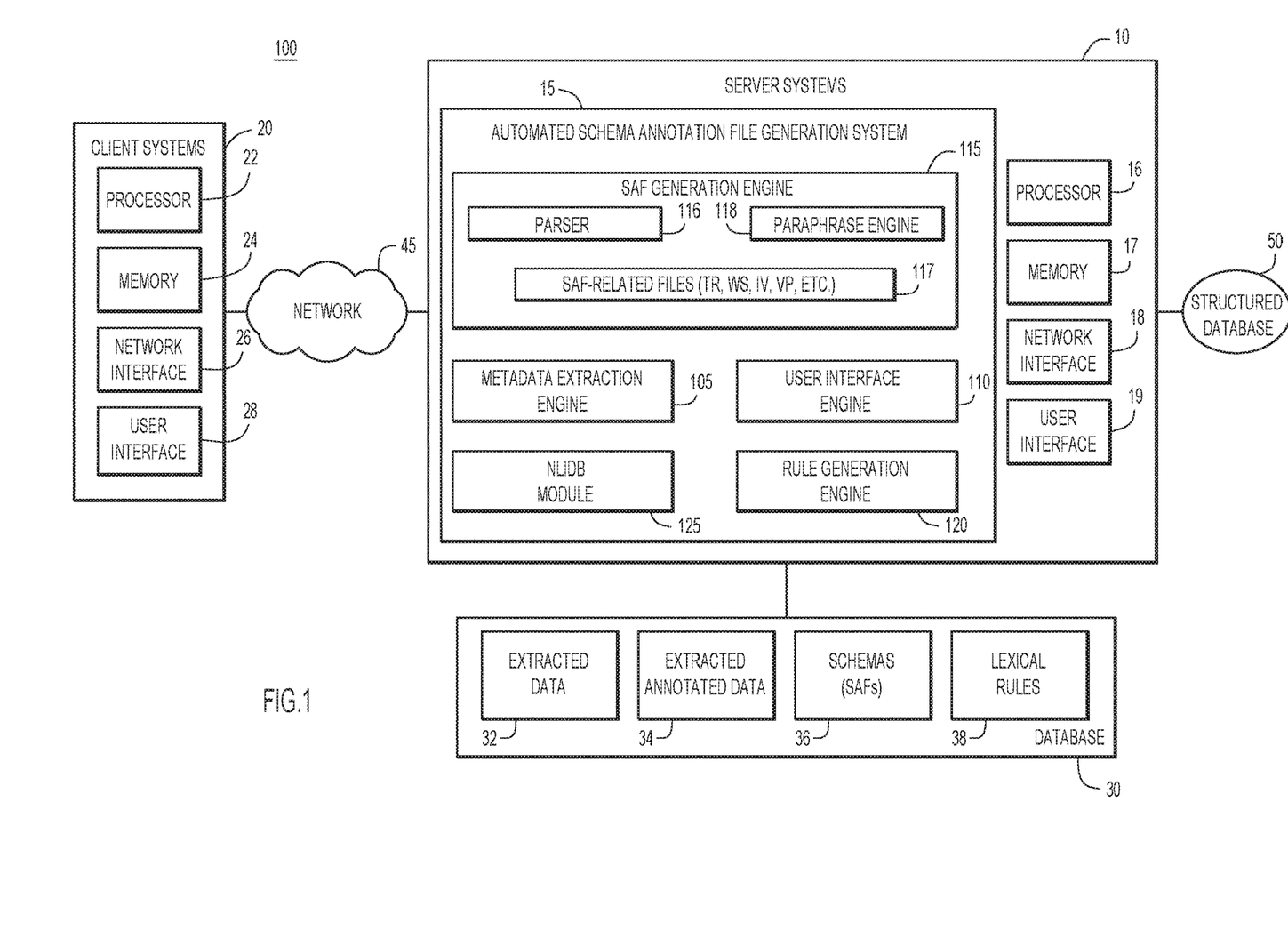
FIG. 1 is a diagrammatic illustration of an example computing environment for an automated schema generation system, according to an embodiment of the present invention.

An example environment for use with present invention embodiments is illustrated in FIG. 1. Specifically, the environment includes one or more server systems 10, one or more client or end-user systems 20, a database 30, and a network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20 may be local to each other, and may communicate via any appropriate local communication medium, such as local area network (LAN), hardwire, wireless link, Intranet, etc.

Client systems 20 enable users to provide annotations to extracted metadata generated by server systems 10, based on structured database 50, for automated SAF creation. The server systems 10 include an automated schema annotation file generation system 15 comprising a metadata extraction engine 105, a user interface engine 110, a SAF generation engine 115, a rule generation engine 120, and NLIDB module 125, as described herein.

A database 30 may store various information for the analysis, such as extracted data 32, extracted annotated data 34, created schemas 36, and lexical rules 38, etc. The extracted data 32 may comprise information extracted from the database 50 (e.g., in a table format, in a tab-delimited format, or any other suitable format, etc.). Extracted data 32 is provided to the user, via the user interface engine 110, for annotation. Once annotated, the data may be stored as extracted annotated data 34. The automated schema annotation file generation system 15 creates schemas 36 based upon the extracted annotated data 34. The system 15 may further generate lexical rules 38, based upon the generated schemas.

The database system 30 and structured database 50 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface, such as a GUI, etc., or other interface, such as command line prompts, menu screens, etc., to solicit information from users pertaining to metadata annotation, as well as a NLIDB module 125 with which to ask questions and receive answers pertaining to the contents of the structured database 50.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, automated schema annotation file generation system software, browser/interface software, etc.). By way of example, the server/client includes at least one processor 16, 22 one or more memories 17, 24 and/or internal or external network interfaces or communications devices 18, 26 such as a modem or network cards, and a user interface 19, 28 etc. The optional input devices may include a keyboard, mouse, or other input device.

Alternatively, one or more client systems 20 may perform automated software service analysis as a stand-alone unit. In a stand-alone mode of operation, the client system stores or has access to the data, such as extracted data 32, extracted annotated data 34, schemas 36, and lexical rules 38. The stand-alone unit includes automated schema annotation file generation system 15. The graphical user or other interface 19, 28, such as a GUI, command line prompts, menu screens, etc., solicits information from a corresponding user pertaining to metadata annotation, as well as a NLIDB module 125 with which to ask questions and receive answers pertaining to the contents of the structured database 50.

Automated schema annotation file generation system 15 may include one or more modules or units to perform the various functions of present invention embodiments described herein. The various modules, a metadata extraction engine 105, a user interface engine 110, a SAF generation engine 115, a rule generation engine 120, and NLIDB module 125, etc., may be implemented by any combination of any quantity of software and/or hardware modules or units, and may reside within memory 17 of the server for execution by processor 16. These modules are described in additional detail below.

Metadata extraction engine 105 extracts metadata from a relational database, such as structured database 50. Metadata may comprise one or more tables, in any suitable form.

The techniques provided herein provide for connecting to a database and extracting metadata that characterizes the database. Metadata includes entity/concept information such as table names, column names, data types present in a database, and/or information about primary keys and foreign keys used to create relationships between tables. The user may connect to the database with user credentials and retrieve various metadata information associated with the database using an application programming interface (API) such as JDBC APIs.

User interface engine 110 may prompt a user to annotate one or more columns from the extracted metadata. The user interface engine receives input from the user to generate annotated metadata.

The user interface engine 110 may create a view of the extracted metadata that shows the structure and relationships of data stored in the relational database. In some aspects, the view may be an abstraction layer in which a set of entities/concepts in the view are connected with links. The view allows renaming of the tables and data entry in columns to provide meaningful descriptions of the extracted metadata.

In other aspects, the view also allows computed columns to be added to tables. For example, if the values of columns are frequently added for reporting purposes, a column may be added and aggregated values assigned to that column. This approach may mask complexity, especially if the values are computed using values from multiple tables. In other cases, retrieving data can be slower or more complicated as queries may need complicated processes to retrieve different pieces of data from a single table or queries may need to address many different tables. While the examples provided herein are with respect to a single table, present techniques may be extended to multiple tables.

SAF generation engine 115 automatically generates a SAF based on the annotated metadata and SAF related files 117. SAF generation is described in further detail throughout the application and figures (see also, FIGS. 3A-3C). Various SAF-related files 117 are needed for SAF creation, including a template-rules (TR) file, a parser 116, a word-semantic (WS) file, an irregular-verbs (IV) file, and a verb-paraphrase (VP) file. Each file type is described in additional detail as follows.

A template-rules (TR) file is a pre-existing file containing template-rules that match common English sentence structures and syntax, which may be used in SAF generation.

Parser 116 is a tool to analyze words and phrases that describe database concepts. The parser may determine grammatical properties (e.g., parts of speech, such as whether a word is in a verb or a noun form, etc.) of the words and phrases from the annotated extracted data.

A word-semantic (WS) file is a file containing a list of common English words with associated semantic types showing certain properties. For example, the WS file may include identity words (e.g., name, type, style, etc.), date types (e.g., date, year, day, time, duration, etc.), location types (e.g., city, country, address, street, etc.) and so forth.

An irregular-verbs (IV) file contains a list of irregular verbs and their past tense.

A verb-paraphrase (VP) file is an automatically created file of the nouns in the SAF entries and their paraphrased verbs. For example, for the entry corresponding to "employee has salary," the word salary may be associated with verbs such as earn, make, receive, etc.

Using the parser, the WS file, and the IV file, the SAF generation engine processes the information for each column and produces one or more SAF entries. The SAF engine also may produce entries for the VP file, which may be used during the question answering process associated with NLIDB module 125.

A SAF is a text file with one entry per line. Each entry consists of a fixed-format word or phrase that describes the relationship between entities/concepts in the database and a set of flags describing the entities/concepts. The SAF may contain at least three types of entries: "property/identity," "association," and "action" entries. Property/identity entries contain information that identifies a concept/entity (e.g., name, ID, type, etc.). Association entries contain information that is associated with a concept/entity (e.g., date of hire, manager, etc.) but does not directly identify the concept/entity. Action entries define semantic relationships between concepts/entities (e.g., typically two entities). In many cases, more than one relationship exists between entities/concepts, and therefore, multiple entries may be needed in order to describe each relationship.

Example SAF entries for a human resources (HR) schema with a single "Employee" table are shown below. The first entry is a property entry for the concept/entity of employee. In particular, the word/phrase "employee" is followed by two flag statements. The first set of flags indicates that "employee" is identified by table EMPLOYEE and column EMPNO and has a datatype of integer. The second set of flags show that the "name" concept/entity is identified by table EMPLOYEE, column EMPNAME, and a datatype of string. The second and third entries are association entries, indicating that "salary" and "hiring date" concepts are associated with an employee—flags identify each concept as in the first entry. The fourth, fifth, and sixth entries are "action" entries. These entries describe sematic relationships between concepts/entities. Examples are shown as follows:

Employee has name; tableName is EMPLOYEE; columnName is EMPNO; dataType is integer; tableName1 is EMPLOYEE; columnName1 is EMPNAME; dataType1 is string;

Employee has salary; tableName is EMPLOYEE; columnName is EMPNO; dataType is integer; tableName1 is EMPLOYEE; columnName1 is SALARY; dataType1 is string;

Employee has hire-date; tableName is EMPLOYEE; columnName is EMPNO; dataType is integer; tableName1 is EMPLOYEE; columnName1 is HIREDATE; dataType1 is date;

Manager manages employee; tableName is EMPLOYEE; columnName is MGRNAME; dataType is string; tableName1 is EMPLOYEE; columnName1 is EMPNO; dataType1 is integer;

Employee is hired on a date; tableName is EMPLOYEE; columnName is EMPNO; dataType is integer; tableName1 is EMPLOYEE; columnName1 is HIREDATE; dataType1 is date;

Department hires employee; tableName is EMPLOYEE; columnName is DPTNAME; dataType is string; tableName1 is EMPLOYEE; columnName1 is EMPNO; dataType1 is integer;

Rule generation engine 120 generates lexical rules 38, based on the created SAF. NLIDB module 125 allows a user to interact with server systems 10 to receive answers pertaining to questions regarding the content of structured database 50. These features and others are described throughout the specification and figures.

Figure 2:
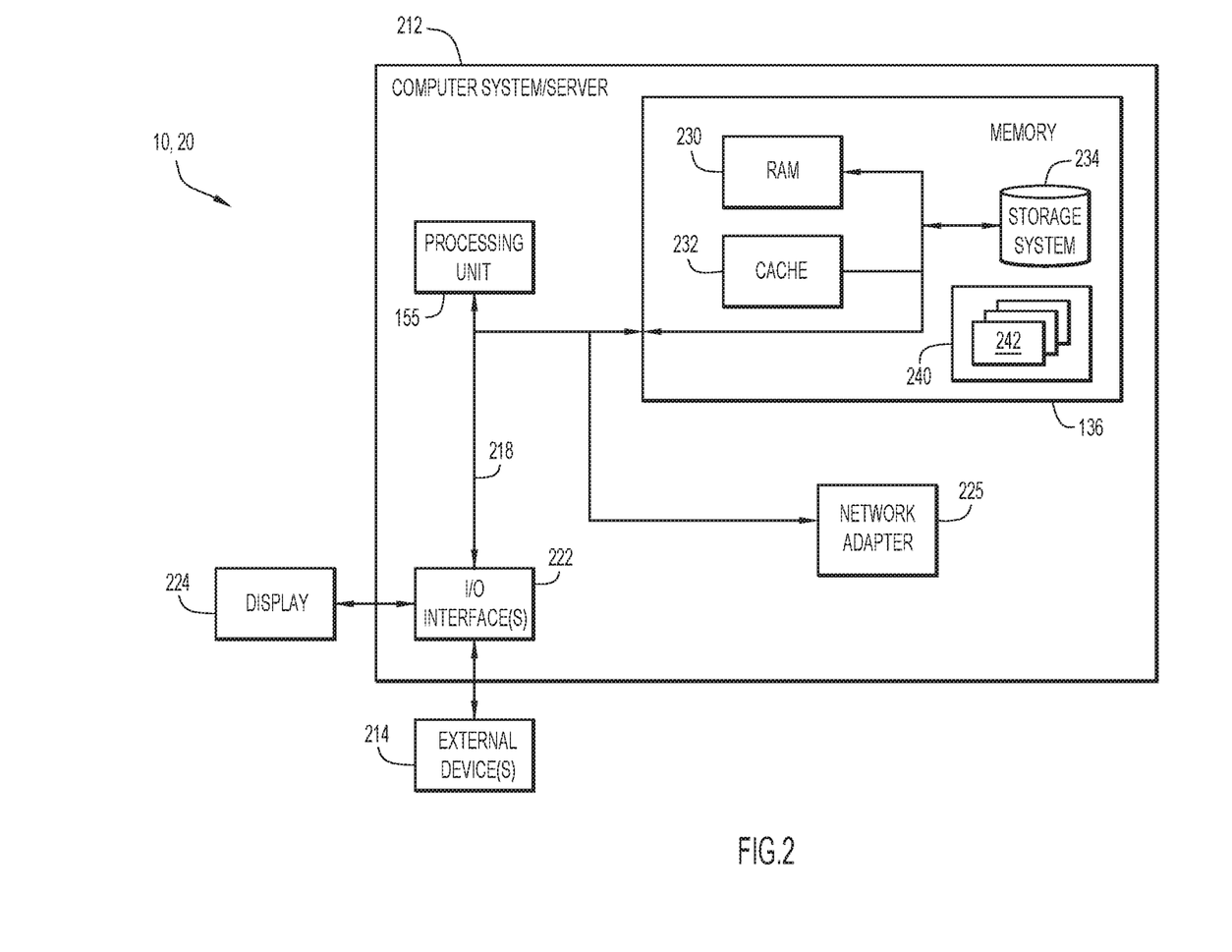
FIG. 2 is an example computing device for the computing environment of FIG. 1, according to an embodiment of the present invention.

Client systems 20 and server systems 10 may be implemented by any suitable computing device, such as computing device 212 shown in FIG. 2 for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., automated schema annotation file generation system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., automated schema annotation file generation system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (IO) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3A:
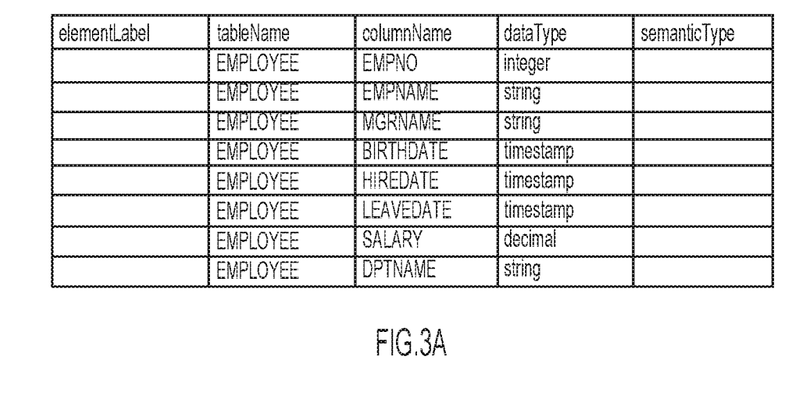
FIG. 3A is an example of extracted metadata, according to an embodiment of the present invention.

FIG. 3A shows an example of metadata extraction from a single-table HR database. This table is generated by extracting data from a database comprising employee characteristics. In this example, metadata is automatically extracted, for example, using metadata extraction engine 105, from the relational database 50 (e.g., table name, column name, and data type).

The extracted data is presented to the user, for example, in a browser format or any other suitable interactive equivalent, for example, using user interface engine 110, allowing the user to annotate the extracted data. In this example, the annotator provides a description for the column "elementLabel" by entering a description for each row in this column (e.g., employee id, employee name, etc.). The annotator may also select a semanticType from a list of valid types (e.g., person, date, money, none, etc.) for each corresponding entry in the column "elementLabel."

In some embodiments, the user is presented with guidelines for annotating the columns and may be provided with a list of supported semantic types with examples as guidelines. Using the guidelines and supported semantic types, the user annotates the metadata to include an element label and a semantic type for each entry. In further aspects, the user may also provide an English word as the name of the table, if the table name is not a standard English word (e.g. if the name of the table is a variable name such as EMP_TABLE, the user may revise the table name to refer to "employee").

Figure 3B:
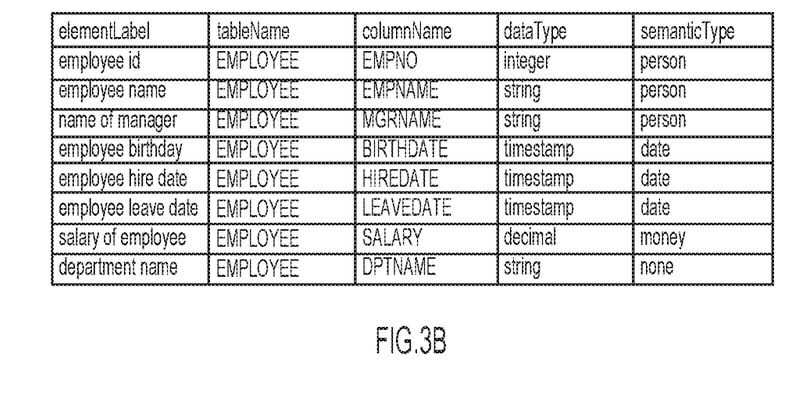
FIG. 3B is an example of extracted metadata that has been annotated by a user, according to an embodiment of the present invention.

In this example, the user annotates the first column and the last column, as shown in FIG. 3B, based on the information provided in the intervening extracted columns (e.g., tableName, columnName, and dataType). The user may annotate the columns that are presented, e.g., in a text format or in a speech format that may be converted to text to generate an annotated table.

This information (e.g., the user annotations, the extracted data, etc.) is processed using the techniques described herein, to generate a SAF file by the automated schema annotation file generating system 15. Each entry of the SAF file comprises a fixed-format phrase that describes the relationship between entities/concepts (e.g., between two entities/concepts) in the database and a set of flags describing each entity/concept. To generate the SAF file, column descriptions and semantic types are analyzed, and semantics of the columns and their relationships to each other are determined. SAF files may be stored as schemas 36. This process is described in additional detail, e.g., see FIG. 3C.

Figure 3C:
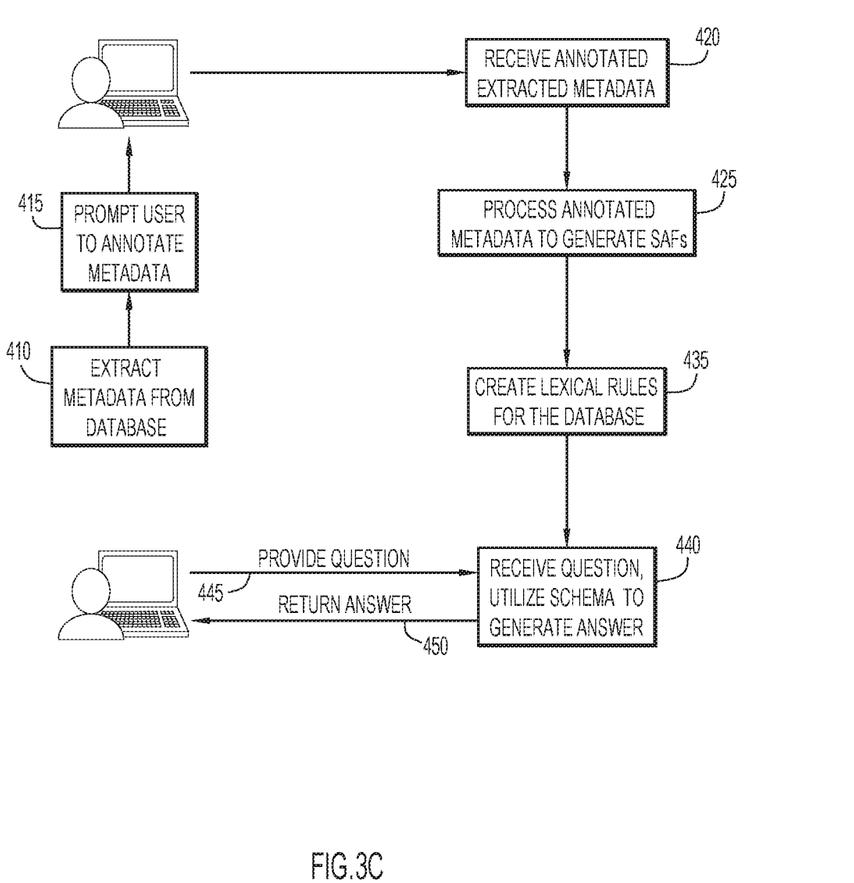
FIG. 3C is a flowchart showing operation of the automatic schema generation system in a natural language processing system that is interacting with a user, according to an embodiment of the present invention.

FIG. 3C shows an example workflow for automated generation of SAF in a system comprising NLIDB module 125. At operation 410, metadata is extracted from a database (e.g., a relational database). At operation 415, a user is prompted to annotate metadata. At operation 420, the annotated metadata is received.

At operation 425, the annotated metadata is processed by the automated schema annotation file generating system 15 to generate a SAF, typically comprising a plurality of entries. Words and/or phrases that are provided by the user (column entries) to label the entries may be classified into a set of categories. For example, words may be classified based on their type (e.g., identity, date, etc.). Words may be further classified based on a part of speech (e.g., nouns, verbs, etc.). In some aspects, verb forms of nouns may be classified as verbs.

Figure 4:
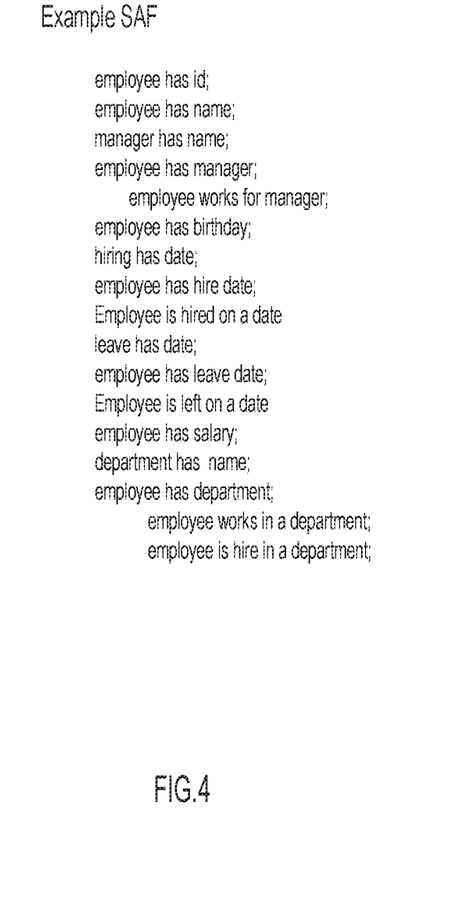
FIG. 4 is an example schema annotation file, generated by the automatic schema generation system, according to an embodiment of the present invention.

Each set of classification results corresponds to a particular pattern of a semantic relationship. For example, if the label is "employee name," the SAF entry may be "employee has name." As another example, if the label is "date of hiring," multiple entries may be created as "employee has hiring date" and "employee is hired on a date." Additional examples of entries in the SAF, generated by the automated schema annotation file generation system 15, are shown in FIG. 4. The indented entries are created from paraphrase engine 118 identifying verbs to connect two nouns.

The main concept/entity of the table (e.g., tablename which is "employee") may be paired with the other columns with a noun classification and sent to a paraphrase engine 118 that produces verbs that semantically connect the concepts/entities (e.g., two or more words). For example, for the entities "employee" and "manager," the paraphrase engine may produce verbs such as "work for," "report to," "hired by," etc. Verbs may be ranked based on their frequency of use. These verbs may be used to create entries that describe relationships between entries in the same table or in different columns and/or tables.

If annotation of the column (element label) contains two or more words, the system will use a supported syntax and will not allow unsupported syntaxes. For example, "employee hire/hiring date" or "hire/hiring date of employee" are supported, but "date of hire/hiring of employee" is not.

Additional details regarding SAF creation are provided as follows. Using the parser 116 along with SAF-related files 117 (e.g., WS file, and IV file), the SAF generation engine 115 analyzes an entry as follows:

a. Is the "identity" concept/entity for the main table concept (e.g., employee name)? Does the phrase contain the table name as one of the concepts/entities?
If yes, the entry describes a concept/entity directly related to the table name, and the semantic type of the other word is compared to the WS file. If the entry matches one of the "identity" words, the system determines that this is an identity entry.

b. Is this an "identity" entity/concept other than the main table name (e.g., "manager name" or "department name")?
The system evaluates this concept/entity using the same process as (a), wherein the entry is not the main table name.

c. Is this a "non-identity" entity/concept (e.g., "employee salary," "employee manager," or "employee hiring date")?
The system evaluates the entry using this analysis if the second concept/entity does not match the "identity" semantic provided in the WS file. If the entity/concept contains multiple words (e.g., "hiring date"), a list of single words is created to represent the multiword entity (e.g., hiring date, hiring, etc.).

These classifications may be used to determine which descriptive words/phrases are "unique" (e.g., there is a single reference in a table-column, such as "manager" or "department"), and which words/phrases are not unique (e.g., "name"). Some concepts, such as semantic type "date" receive special classifications. If there are multiple dates in the table, (e.g., "hiring-date" and "leaving-date"), even though the individual words are unique, these words refer to the same concept type "date" and are therefore not considered unique.

Based on these classifications, SAF entries are created and the flag statements are configured based on the information extracted from the table. For a first classification, a single "property" entry is created for the main element (e.g., "employee has name").

For the second classification, multiple entries are created as follows:
a) A "property" entry is created for the concept (e.g. "manager has name").
b) A second "property" entry is created for the main element (i.e. "employee has manager").
c) The parser 116 extracts the properties of the concept/entity. In this case, "manager" is shown as a "noun" but may also have a verb form "manage." Since there is a verb form for the main element, a third entry is created that reads "manager manages employee." If the main element does not have a verb form, an entry may be created with a non-specific default keyword verb (e.g., for the "department name" column, the entry may read "department name—verb—employee," where verb is set as a default verb (e.g., includes, hires, etc.)).
d) A fourth entry is produced with the syntax "main element—verb—preposition—noun." The verb and prepositions are default keywords. The entry will have the format: "employee—verb—prep—manager," which is equivalent to "employee reports to manager" without specifying the specific semantics for the verb and preposition. Similarly, "employee—verb—prep—department" may be another entry that is produced.
e) In addition to the SAF entries, the two noun concepts (e.g., employee and manager) are processed through the paraphrase engine 118 and a list of relevant verbs that connect these concepts is extracted (e.g., for "employee and department" the verb "work," and for "employee" and "salary" the verb "earn," etc.). The concept nouns and their associated verbs are added to the VP file to be used during the question answering phase.

The third classification is similar to the second classification, except when multiple words that describe the concept and/or specific semantic types, such as date, characterize the concept:

a) A property entry is created for the underscored single word created from the multiple words (e.g., "employee has hire date").
b) A property entry is created from the multiple words themselves (e.g., "hire has date")
c) The multiple words are compared to the WS file. If one of the words has the "date" or "location" type, and the parser 116 detects a verb form of the other word, the past tense of the verb is created or extracted from the IV file, and an entry is created using the verb form of the word. For example, "employee hiring date" will produce "employee is hired on a date." If there is a column with a description "employee's residence country," an entry may be created as "employee resides in a country." The prepositions used are "on" for date, "in" for location, and "for" for other types. However, the entries are created regardless of the specific preposition used, provided that the syntax is correct.

This automatic process may produce a small number of entries with incorrect syntax or semantics that may be dismissed by the lexical-rules creation process. Regardless, the collective body of the entries provides sufficient ontological representation to enable answering most questions.

At operation 425, the SAF file is generated (see also, FIG. 4) based on the annotations and extracted metadata as described herein. The parser, WS file, and IV files are preexisting resources that are used during creation of the SAF. The TR file is used during the training phase when the SAF is processed to create semantic-rules for the schema. The VP file is produced during SAF creation and is used during operation phase, in order to answer a user question.

At operation 435, lexical rules are created to automate SAF entries. Once the SAF is generated, pre-existing files containing lexical rules may be used for processing the SAF in response to user queries. The lexical rules may be used to match language syntax and structure.

For SAF generation performed in an automated manner, the lexical rules that are generated include rules that (1) match phrases with precise lexical information and also (2) are broader and do not impose precise lexical information to match a phrase. Generating the SAF in an automated manner allows for entries that are more abstract and do not contain precise lexical information.

An example of a template rule that is used to match phrases with precise lexical information is (the first line is the name of the rules and specifies that there are two noun variables and one verb):

```
root=prop_owner_VAR1_VAR2_VAR3_
-> VAR2 [ hasPartOfSpeech("verb"), hasLemmaForm("VAR2") ]
 {subj -> VAR1[hasPartOfSpeech("noun"), hasLemmaForm("VAR1")]}
 { obj -> VAR3 [hasPartOfSpeech("noun"), hasLemmaForm("VAR3")]}
```

The above rule matches any sentence with the pattern "Subject Verb Object." The first line is the title or name of the rule. VAR1 and VAR2 are generic representations of subject and object, and verb is the representation for any verb. The lexical rule created by this template rule will match precise words for the subject, verb, and the object (as the rule imposes the lemma form of the words).

An example of a template rule that is used in automatic SAF processing is (does not impose precise lexical information to match a phrase):

```
root=prop_owner_VAR1_VAR2_VAR3_
-> VAR2 [ hasPartOfSpeech("verb") ]
 { subj -> VAR1[hasPartOfSpeech("noun"), hasLemmaForm("VAR1") ] }
 { obj -> VAR3 [hasPartOfSpeech("noun"), hasLemmaForm("VAR3")]}
```

The above rule is similar to the first rule in syntax, but does not specify the lemma form for the verb. As a result, the lexical rule that is created does not have explicit semantic information and lacks a specific word for the verb (in some cases, created with default keyword verbs), and any sentence with the matching syntax will match the words for subject and object regardless of what the word for the verb is. These types of rules may be identified as described herein.

As another example, for the column "department name" (that produces multiple SAF entries), the entries "department has name" and "manager manages employee" produce precise lexical rules. However, "department—verb—employee" will match a rule as follows:

```
root=prop_owner_department_verb_employee_
-> _verb_ [ hasPartOfSpeech("verb") ]
 { subj -> department[hasLemmaForm("department") ] }
 { obj -> employee [ hasLemmaForm("employee")]}
```

The above rule will match any sentence with the syntax Subject Verb Object, where subject is department and object is employee. Questions such as "how many employees did the sales department hire" will match one of the derivatives of the above rule and will be answered correctly. However, for a question such as "how many employees in the sales department retired", since the verb in the rule is non-specific, this question will be answered exactly the same way as the previous question. To avoid mismatches, during the question processing, the rules with non-specific verbs are checked against the VP file that was created during the SAF creation process. This file is created using a paraphrase engine 118, and includes a list of reasonable verbs that associate an employee with a department. If a verb in the sentence doesn't match any of the verbs listed for these two nouns, the rule will be dismissed.

The lexical rules are applied to the SAF entries to find matching syntax. When a SAF entry matches a rule, a new rule is automatically created with the syntax of the template rule but replacing the generic variables with the words from SAF entry. For example, applying the "subject verb object" rule of the template file to the fourth entry of the above example, the following lexical rule will be created:

```
root=prop_owner_manager_manage_employee_
-> manage [ hasPartOfSpeech("verb"), hasLemmaForm("manage") ]
 { subj -> manager hasLemmaForm("manage") ] }
 { obj -> employee [ hasLemmaForm("employee")]}
```

The above rule precisely matches the syntax and semantics of "manager manages employee". For each of the entries that match one of the templates rules, a range of derivative rules, with different syntaxes and with the same semantic information, is automatically created to enable answering different types of questions. For example, derivative rules of entry four can match "how many employees does John manage" or "which manager manages Jack", or "who manages more employees than Joe". Entry five derivatives will support questions like "who was hired after 2013," or "how many employees were hired after Jim," etc.

The template rules may be applied to SAF entries during a training process, and schema-dependent lexical-rules that match the syntax of template rules but contain the semantic information of SAF may be automatically created.

The lexical-rules file may be used during the operation phase, to process input questions from a user to SQL, as shown as operations 440, 445 and 450. The lexical rules for automatic SAF are broader and may match input sentences with semantics that are not present in the database. Hence, processing the automatically created SAF rules will require more resources and algorithmic analysis to identify incorrect rule matches. These techniques may be used with manually created lexical rules to match any input sentence that has the precise syntax and semantics of the SAF entries.

Thus, the automated schema and lexical rules for the database, may be used to answer user questions. Questions may be sent to the system by a user at operation 445. The system may process the question, utilizing the lexical rules and automated schema to obtain the answer in the database 50. Answers to the user question may be provided by the system at operation 450.

FIG. 4 shows an example of entries in a SAF, generated by the automated schema annotation file generation system 15. The indented entries are created from paraphrase engine 118 identifying verbs to connect two nouns.

Figure 5:
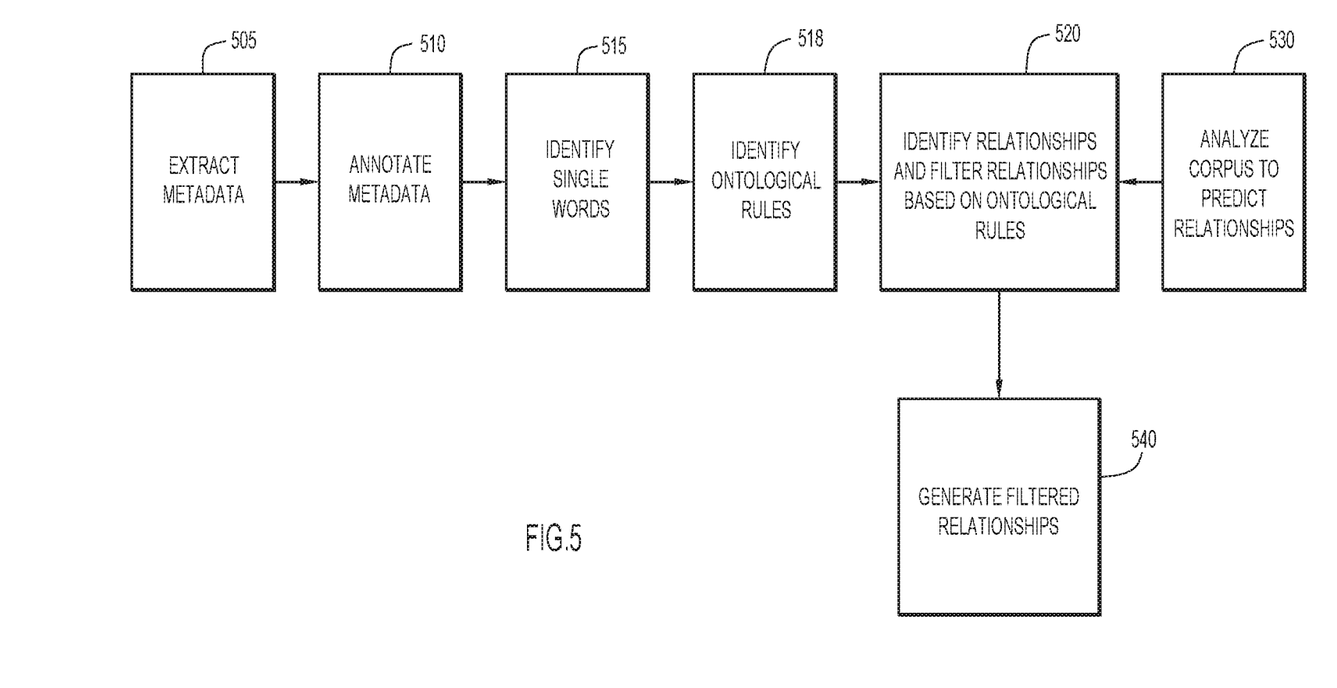
FIG. 5 is a flowchart showing determination and filtration of additional relationships for inclusion into the schema annotation file, according to an embodiment of the present invention.

FIG. 5 shows another embodiment in which corpus analysis and additional resources (e.g., online resources) may be used to connect concepts/entities to ontological relationships, i.e. using verbs having as arguments, respective nouns. This type of analysis may be used to manage annotations that are a single word.

According to this embodiment, metadata extraction from the relational database may occur at operation 505. The entries may be annotated, some with a single word, at operation 510. The single word annotations may be identified at operation 515, and selected for further analysis. Additional ontological rules are provided at operation 518. The system may use various syntactic, ontological and semantic rules.

At operation 530, the system analyzes a corpus of data to learn relationships between words. In some aspects, the system computes the probabilities of occurrence in specific syntactic positions for each verb and then uses a chain probability equation to rank the candidates, allowing precise and relevant relationships to be determined.

As an example of a probability computation, for any noun (n) respectively, and for any syntactic position ((s) such as subj, obj, or prepositional object of prepositions (e.g., to, at, from), and any verb (v)), the probability of v and s for n may be determined:

$$p(v,s|n)=p(v,s,n)/p(n)\sim p(v|n)*p(v|s)*p(n|v,s).$$

Probabilities p(v|n), p(v|s) p(n|s) from the corpus can be determined, which may be domain specific or general. For any two nouns (n1 and n2), and for any combination of syntactic positions (s1, s2), the probability may be computed:

$$p(v,n1,n2)\sim p(v,s1|n1)*p(v,s2|n2)$$

and the verbs may be ranked based on this probability. Verbs ranked too high, too low, or too frequent are typically not considered. Ontological constraints may be collected automatically from informational sources, such as from any online or digitized source, and may be used to identify relationships.

At operation 520, the relationships identified from the corpus may be filtered based on ontological rules, for example, by applying syntactic restrictions, ontological similarity, and/or semantic similarity. For example, ontological rules include nouns that co-occur together, verbs that co-occur with nouns, etc. As another example, restrictions may be imposed on possible combinations of syntactic combinations, such that complement positions, such as "subj subj" etc., are not considered. Filtered relationships are provided at operation 540.

In other aspects, a machine learning system may be trained to create schema-specific lexical rules with semantic annotation. The machine learning system may use the SAF and template rules that are based on fixed syntactical rules of English language to create schema-specific lexical rules. For example, additional lexical rules may be created by supervised machine learning training with natural language phrases that paraphrase the SAF entries. These additional rules expand the initial fixed rule set and create a richer set of lexical rules that enable processing of a broader range of natural language phrases.

Figure 6:
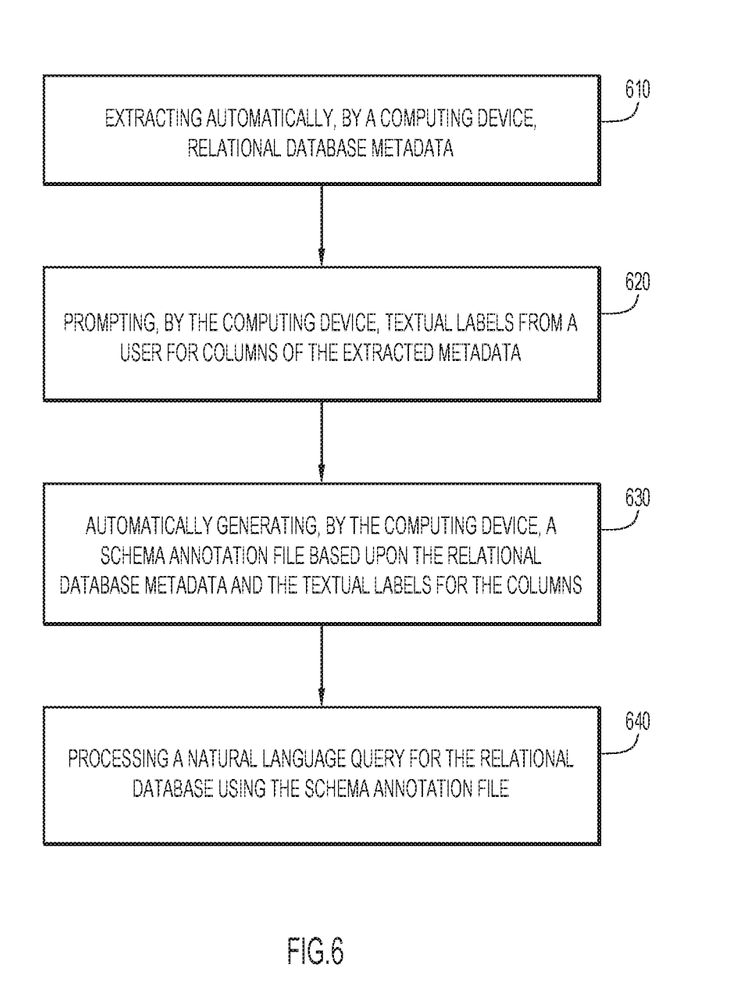
FIG. 6 is a high level flowchart showing operations of the automated schema annotation file system, according to an embodiment of the present invention.

FIG. 6 is an operational flow chart showing high level operations of the automatic schema annotation file generating system 15 provided herein. At operation 610, relational database metadata is extracted automatically by a computing device. At operation 620, the computing device prompts for textual labels (e.g., provided by a user) for columns of the metadata. At operation 630, the computing device automatically generates a schema annotation file based upon the relational database metadata and the textual labels for the columns. At operation 640, a natural language query for the relational database is processed using the schema annotation file.

Features of present invention embodiments include automated generation of SAF. Generation of the SAF files is based on minimal annotation from a user, and the user does not need knowledge of the structure or ontology of the database from which the metadata was obtained. Further, the SAF entries are generated in a manner that is broader than manually generated entries. Accordingly, the SAF are more robust than manual methods of creating SAF files. Still further, schema-specific lexical rules may be created from the automatically generated SAFs. The SAFs generated herein may be used with systems that interact with a user, e.g., in a question and answer manner. For example, lexical rules, generated from the automated SAF, are applied to the user input question to detect and process contents of the user question. The created SAF and the fixed template-rules are used to automatically create a set of lexical rules that are related to the particular database schema. The NLP engine applies these rules to the natural language user questions to detect the elements and the semantic relations between the words and create a set of intermediate structured phrases that will then be converted to SQL clauses.

Lexical rules from automatically created SAF are broad and may contain non-specific lexical information. The lexical rules may be refined with additional information (e.g., online or other textual resources to extract correct meaning from the elements of the input question) in order to construct proper SQL queries.

Thus, these techniques improve the operation of the computer, and in particular, to NLIDBs systems that interact with a user, as SAFs may be automatically generated with minimal annotation. The SAFs provide a framework for generating lexical rules to access the contents of the database.

It will be appreciated that the embodiments described above and illustrated in the drawings represent only a few of the many ways of implementing embodiments for generating a SAF in an automated manner based on received annotation.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, automated schema annotation file generating system 15, etc.). These systems may include any type of monitors and input devices (e.g., keyboard, mouse, voice recognition, etc.) to enter and/or view information.

It is to be understood that the software (e.g., automated schema annotation file generating system 15, including metadata extraction engine 105, user interface engine 110, SAF generation engine 115, rule generation engine 120, and NLIDB module 125, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., automated schema annotation file generating system 15, including metadata extraction engine 105, user interface engine 110, SAF generation engine 115, rule generation engine 120, and NLIDB module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., extracted data 32, extracted annotated data 34, schemas 36, lexical rules 38, etc.). The database system may be implemented by any number of any conventional or other databases, data stores or storage structures (e.g., files, databases, data structures, data or other repositories, etc.) to store information (e.g., extracted data 32, extracted annotated data 34, schemas 36, lexical rules 38, etc.). The database system may be included within or coupled to the server and/or client systems. The database systems and/or storage structures may be remote from or local to the computer or other processing systems, and may store any desired data (e.g., extracted data 32, extracted annotated data 34, schemas 36, lexical rules 38, etc.).

The present invention embodiments may employ any number of any type of user interface (e.g., Graphical User Interface (GUI), command-line, prompt, etc.) for obtaining or providing information (e.g., extracted data 32, extracted annotated data 34, schemas 36, lexical rules 38, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the automated schema annotation file generation system 15 may include any information arranged in any fashion, and may be configurable based on rules or other criteria to provide desired information to a user (e.g., metadata, answers to questions, etc.).

The present invention embodiments are not limited to the specific tasks or algorithms described above, but may be utilized for any application in which automated schema generation is useful. Further, this approach may be generally applicable to a variety of technological domains, including but not limited to, human resources, medical, financial, marketing, government, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An automated method using a computing device to create a semantic model of a relational database for processing natural language queries, the method comprising:
    extracting automatically, by the computing device, relational database metadata, wherein the extracted metadata includes information for database table columns of the relational database;
    prompting, by the computing device, textual labels from a user for annotating the database table columns of the extracted metadata, wherein the textual labels include a semantic type and description for a corresponding database table column;
    annotating, by the computing device, the database table columns of the extracted metadata with the textual labels provided by the user;
    automatically generating, by the computing device, a schema annotation file based upon the extracted metadata and the textual labels provided by the user for annotating the database table columns of the extracted metadata, wherein the schema annotation file includes entries that describe entities and entity relationships in the relational database and associate the entities to database objects, and automatically generating the schema annotation file comprises:
        classifying words of the description of the textual labels into a set of categories based on semantic type and part of speech, wherein classification results for sets of the words correspond to patterns for semantic relationships;
        determining verbs for use between the words of the description of the textual labels classified as nouns; and
        generating at least one entry for the schema annotation file including the words of the description of at least one textual label and the determined verbs based on the semantic relationships;
    processing, by the computing device, the schema annotation file into lexical rules with semantic annotation corresponding to the relational database, wherein the lexical rules indicate a syntax for natural language and include terms from the schema annotation file including the words of the description of one or more textual labels; and
    processing a natural language query for the relational database including the words of the description of a textual label, wherein processing the natural language query comprises:
        applying the lexical rules to the natural language query to detect terms of the natural language query associated with the relational database and semantic relationships between the terms;
        creating a set of structured phrases from the detected terms and semantic relationships within the natural language query; and
        converting the structured phrases to structured query language clauses to produce a structured query.

2. The method of claim 1, wherein the user provides the textual labels for the extracted metadata without knowledge of a structure of the relational database or of an ontology of the relational database.

3. The method of claim 1, wherein the extracted metadata is provided in the form of a table, and the extracted metadata comprises a table name, and one or more column names in the table.

4. The method of claim 1, wherein the relational database is domain independent.

5. The method of claim 1, wherein the schema annotation file is created using natural language processing of user input to extract semantics, and wherein the extracted semantics are used to create relationships between entities of the relational database.

6. The method of claim 1, further comprising:
    creating, with a machine learning system, schema-specific lexical rules with semantic annotation, wherein the machine learning system uses the schema annotation file and template rules based on fixed syntactical rules of English language to create the schema-specific lexical rules.

7. The method of claim 1, wherein processing the natural language query comprises:
    receiving a natural language question from the user as the natural language query; and
    generating an answer to the received natural language question, based upon results of the structured query.

8. A system for creating a semantic model of a relational database for processing natural language queries, the system comprising:
    one or more processors;
    one or more computer readable storage media;
    program instructions stored on the one or more computer readable storage media for execution by the one or more processors, the program instructions comprising instructions to:
        extract automatically relational database metadata, wherein the extracted metadata includes information for database table columns of the relational database;
        prompt textual labels from a user for annotating the database table columns of the extracted metadata, wherein the textual labels include a semantic type and description for a corresponding database table column;
        annotate the database table columns of the extracted metadata with the textual labels provided by the user;
        automatically generate a schema annotation file based upon the extracted metadata and the textual labels provided by the user for annotating the database table columns of the extracted metadata, wherein the schema annotation file includes entries that describe entities and entity relationships in the relational database and associate the entities to database objects, and automatically generating the schema annotation file comprises:
  classifying words of the description of the textual labels into a set of categories based on semantic type and part of speech, wherein classification results for sets of the words correspond to patterns for semantic relationships;
  determining verbs for use between the words of the description of the textual labels classified as nouns; and
  generating at least one entry for the schema annotation file including the words of the description of at least one textual label and the determined verbs based on the semantic relationships;
process the schema annotation file into lexical rules with semantic annotation corresponding to the relational database, wherein the lexical rules indicate a syntax for natural language and include terms from the schema annotation file including the words of the description of one or more textual labels; and
process a natural language query for the relational database including the words of the description of a textual label, wherein processing the natural language query comprises:
  applying the lexical rules to the natural language query to detect terms of the natural language query associated with the relational database and semantic relationships between the terms;
  creating a set of structured phrases from the detected terms and semantic relationships within the natural language query; and
  converting the structured phrases to structured query language clauses to produce a structured query.

9. The system of claim 8, wherein the user provides the textual labels for the extracted metadata without knowledge of a structure of the relational database or of an ontology of the relational database.

10. The system of claim 8, wherein the extracted metadata is provided in the form of a table, and the extracted metadata comprises a table name and one or more column names in the table.

11. The system of claim 8, wherein the schema annotation file is created using natural language processing of user input to extract semantics, and wherein the extracted semantics are used to create relationships between entities of the relational database.

12. The system of claim 8, wherein the program instructions executable by the one or more processors are further configured to:
  receive a natural language question from the user as the natural language query; and
  generate an answer to the received natural language question, based upon results of the structured query.

13. A computer program product for creating a semantic model of a relational database for processing natural language queries, the computer program product comprising one or more computer readable storage media collectively having program instructions stored on the one or more computer readable storage media, the program instructions executable by a computer to cause the computer to:
  extract automatically relational database metadata, wherein the extracted metadata includes information for database table columns of the relational database;
  prompt textual labels from a user for annotating the database table columns of the extracted metadata, wherein the textual labels include a semantic type and description for a corresponding database table column;
  annotate the database table columns of the extracted metadata with the textual labels provided by the user;
  automatically generate a schema annotation file based upon the extracted metadata and the textual labels provided by the user for annotating the database table columns of the extracted metadata, wherein the schema annotation file includes entries that describe entities and entity relationships in the relational database and associate the entities to database objects, and automatically generating the schema annotation file comprises:
    classifying words of the description of the textual labels into a set of categories based on semantic type and part of speech, wherein classification results for sets of the words correspond to patterns for semantic relationships;
    determining verbs for use between the words of the description of the textual labels classified as nouns; and
    generating at least one entry for the schema annotation file including the words of the description of at least one textual label and the determined verbs based on the semantic relationships;
  process the schema annotation file into lexical rules with semantic annotation corresponding to the relational database, wherein the lexical rules indicate a syntax for natural language and include terms from the schema annotation file including the words of the description of one or more textual labels; and
  process a natural language query for the relational database including the words of the description of a textual label, wherein processing the natural language query comprises:
    applying the lexical rules to the natural language query to detect terms of the natural language query associated with the relational database and semantic relationships between the terms;
    creating a set of structured phrases from the detected terms and semantic relationships within the natural language query; and
    converting the structured phrases to structured query language clauses to produce a structured query.

14. The computer program product of claim 13, wherein the user provides the textual labels for the extracted metadata without knowledge of a structure of the relational database or of an ontology of the relational database.

* * * * *